3,008,937
CATALYTIC CROSSLINKING OF VINYL-TOLUENE POLYMERS

Norman R. Ruffing and James L. Amos, Midland, Mich., assignors to The Dow Chemical Company, Midland, Mich., a corporation of Delaware
No Drawing. Filed June 3, 1957, Ser. No. 662,986
5 Claims. (Cl. 260—85.5)

This invention concerns a catalytic method for crosslinking thermoplastic polymers and copolymers of vinyltoluene. More particularly, it relates to a process for crosslinking vinyltoluene homopolymers and copolymers of vinyltoluene with monovinyl comonomers by reaction at elevated temperatures in the presence of an organic peroxide catalyst.

It has been taught that polymers of 2,4-dimethylstyrene can be cured to insolubility in conventional solvents for its uncured polymers by heating at temperatures greater than 40° C. in the presence of a tertiary-butyl peroxide. The curing is stated to be unique to tertiary-butyl peroxides. It is expressly taught that such peroxides as benzoyl peroxide degrade polymers of 2,4-dimethylstyrene when heated therewith.

It has now been discovered that thermoplastic polymers of vinyltoluene, in particular, thermoplastic homopolymers of vinyltoluene and copolymers of vinyltoluene with other monovinyl alkyl and aryl comonomers containing at least 50 weight percent of vinyltoluene, can be crosslinked to the point where they are substantially more viscous or are merely gelatinized or swollen or are unaffected by conventional solvents for the corresponding polymers and copolymers in their thermoplastic or non-crosslinked form by heating such polymers and copolymers in the presence of an organic peroxide having no tertiary-butyl substituent in amounts ranging between 0.02 and 5 weight percent, polymer basis, at temperatures between about 150° C. and 225° C., preferably at temperatures ranging between 50° C. above the decomposition temperature of such peroxides and 225° C., for a time sufficient to get the desired degree of crosslinking, usually between one and 10 minutes. Below the minimal temperatures indicated, the rate and amount of crosslinking are uneconomic. Above 225° C., the polymers and copolymers become discolored.

It is advantageous that the homo polymer or copolymer and the peroxide be mixed together intimately prior to the heating step. While mechanical mixtures can be used, it is more advantageous to dissolve the polymer and peroxide in a mutual solvent and then to evaporate solvent prior to heating at crosslinking temperatures. Alternatively, the peroxide catalyst can be dissolved in a non-solvent for the polymer and poured over the polymer which is in particulate form. The peroxide solvent is then evaporated prior to heating to crosslinking temperatures. A mutual solvent for the polymer and catalyst is preferred, since more highly crosslinked products can be obtained therewith at equal concentrations of catalysts as compared with a peroxide solvent which is a non-solvent for the polymer.

Organic peroxides useful in the practice of this invention include conventional organic peroxides, except tertiary-butyl peroxides, such as benzoyl peroxide, lauroyl peroxide, cumene hydroperoxide, dicumyl peroxide, diisopropylbenzene dihydroperoxide, diacetyl peroxide, tetralin peroxide and the like.

By way of example, the following polymers have been crosslinked pursuant to the practice of this invention: polymers of isomeric vinyltoluenes, copolymers of: m,p-vinyltoluene and styrene; m,p-vinyltoluene and alpha-methylstyrene; m,p-vinyltoluene and methyl methacrylate; m,p-vinyltoluene and acrylonitrile; m, p-vinyltoluene and ethylacrylate; etc.

The following examples show ways in which the invention has been practiced. Parts and percentages therein and in the claims are by weight.

EXAMPLE 1.—CATALYTIC CROSSLINKING OF POLYVINYLTOLUENE

A quantity of 180 g. of poly-m,p-vinyltoluene (65 percent meta, 35 percent para) was dissolved in 720 g. of methylene chloride. The solution viscosity of the polymer was 25.7 cps., 10 percent by weight polymer in toluene at 25° C. To the polymer solution was added 3.6 g. of benzoyl peroxide, and the resulting solution was thoroughly mixed. The methylene chloride was removed under a vacuum of 3–5 mm. mercury, absolute pressure, at room temperature, leaving an intimate mixture of catalyst and polymer. A series of samples of such mixture was heated in an air oven for five minutes at various temperatures, as indicated in the following table. After heating for five minutes, the extent of crosslinking was determined by visually observing samples of the crosslinked polymers in toluene.

Table I

| Heating Temp., 5 Mins. | Character of Polymer in Toluene (10 percent by weight polymer) |
|---|---|
| 150° C | largely insoluble, highly swollen mass. |
| 175° C | Do. |
| 200° C | largely insoluble, less swollen than at 175° C. |
| 225° C | largely insoluble, less swollen than at 200° C. |

EXAMPLE 2.—SOLVENT ADDITION OF CATALYST IN SOLVENT AND NON-SOLVENT FOR POLYMER

Two comparative runs were made with both a polymer solvent and a polymer non-solvent. Each run was with poly-m,p-vinyltoluene to which had been added 2 percent benzoyl peroxide, dissolved in methanol (run 1), and dissolved in acetone (run 2). The solvent was removed from polymer-catalyst mixture under a vacuum of 3–5 mm. mercury, absolute pressure, at 35° C. Recovered polymer-catalyst mixtures were compression molded at 150° C. for three minutes at 5,000 p.s.i. pressure.

Table II

| Catalyst Added in— | Character of 10 Weight Percent Polymer in Toluene |
|---|---|
| methanol | partially crosslinked, considerably gelled. |
| acetone | highly crosslinked, highly swollen mass. |

EXAMPLE 3.—DICUMYL PEROXIDE CATALYZED POLYVINYLTOLUENE

Poly-m,p-vinyltoluene (25.7 cps. solution viscosity) to which had been added two percent by weight of dicumyl peroxide according to the procedure of Example 1 was heated in an air oven as in Example 1. The following observations were made on polymer samples placed in toluene.

Table III

| Heating Temp., 5 Mins. | Character of 10 Weight Percent in Toluene |
|---|---|
| 150° C | completely soluble. |
| 175° C | partially soluble, some gels apparent. |
| 200° C | partially soluble, many gels apparent. |
| 225° C | largely insoluble, highly swollen mass. |

It is evident by comparison of the results of Examples 1 and 3 that the base temperature at which a catalyst becomes effective for the crosslinking reaction varies with the decomposition temperature of the catalyst. Catalysts such as benozyl peroxide, which decompose at relatively low temperatures, effectively crosslink the indicated polymers and copolymers of alkyl vinylaryl monomers at lower temperatures than do catalysts such as dicumyl peroxide which decompose at relatively higher temperatures. Use of low temperature decomposition peroxides, therefore, permits higher degrees of crosslinking at lower temperatures and permits production of crosslinked polymers of better color and clarity than high temperature decompostion peroxides.

EXAMPLE 4.—BENZOYL PEROXIDE CATALYZED POLYMERS

The following polymers and copolymers have also been prepared and catalytically crosslinked with benzoyl peroxide, similarly to the procedures of Examples 1 and 2. The several methods of catalyst addition and crosslinking conditions are noted for each.

(a) Poly-o,p-vinyltoluene (30 percent ortho, 70 percent para)
(b) Poly-o-vinyltoluene
(c) Copolymers of 50 weight percent m,p-vinyltoluene, 50 percent styrene
(d) Copolymers of 85 percent m,p-vinyltoluene, 15 percent alpha-methylstyrene
(e) Copolymers of 88 percent m,p-vinyltoluene, 12 percent methyl methacrylate
(f) Copolymers of 75 percent m,p-vinyltoluene, 25 percent acrylonitrile Samples of a and b were prepard by adding benzoyl peroxide in polymer solvents, acetone and methylene chloride. Another series of samples of a, c, e and f was prepared by adding benzoyl peroxide in polymer nonsolvent, methanol. A further series of samples of a, e, and d was crosslinked by heating in an air oven. Another series of samples of c, d, e, and f was crosslinked by the compression molding technique of Example 2.

EXAMPLE 5.—BENZOYL PEROXIDE CATALYZED POLY(VINYLTOLUENE), METHANOL SOLVENT

The following runs were made with granulated poly-m,p-vinyltoluene to which was added varying amounts of benzoyl peroxide dissolved in methanol. Crosslinking was accomplished by compression molding polymer-catalyst mixtures at 150° C. for three minutes at 5,000 p.s.i.

Table IV

| Weight Percent Benzoyl Peroxide | Character of crosslinked polymer in Toluene |
| --- | --- |
| 3.0 | highly crosslinked, highly swollen mass. |
| 2.0 | Do. |
| 1.0 | crosslinked, many gels. |
| 0.5 | Do. |
| 0.1 | crosslinked, some gels. |
| 0.05 | Do. |

What is claimed is:
1. A method of catalytically crosslinking a thermoplastic polymer of the group consisting of homopolymers of vinyltoluene and copolymers of at least 50 weight percent of vinyltoluene with another monovinyl compound copolymerizable therewith, which method consists in heating said polymer in intimate contact with between 0.02 and 5 weight percent, polymer basis, of a peroxide catalyst of the group consisting of benzoyl peroxide, lauroyl peroxide, cumene hydroperoxide, dicumyl peroxide, diisopropylbenzene dihydroperoxide, diacetyl peroxide and tetralin peroxide at a temperature ranging between 50° C. above the decomposition temperature of said peroxide and 225° C. and recovering a crosslinked product.

2. The method of claim 1 wherein the temperature ranges between 150° and 225° C.

3. The method of claim 1 wherein the polymer to be crosslinked is a polymer of a mixture of m- and p-vinyltoluene.

4. The method of claim 1 wherein the copolymer to be crosslinked is a copolymer of 50 weight percent m,p-vinyltoluene and 50 percent styrene.

5. The method of claim 1 wherein the copolymer to be crosslinked is a copolymer of 75 weight percent m,p-vinyltoluene and 25 percent acrylonitrile.

References Cited in the file of this patent
UNITED STATES PATENTS

| 2,403,213 | D'Alelio | July 2, 1946 |
| 2,475,002 | Biggs | July 5, 1949 |
| 2,638,465 | Amos et al. | May 12, 1953 |
| 2,734,894 | Vaughan | Feb. 14, 1956 |
| 2,811,514 | Hagemeyer | Oct. 29, 1957 |
| 2,950,503 | McRae | Aug. 30, 1960 |

OTHER REFERENCES

Grassie: "Chemistry of High Polymer Degradation Processes," published 1956 by Buttersworth Scientific Publications, pages 52–62.